(12) United States Patent
Shimamune et al.

(10) Patent No.: US 6,527,940 B1
(45) Date of Patent: Mar. 4, 2003

(54) PRODUCTION METHOD OF ACID WATER AND ALKALINE WATER

(75) Inventors: Takayuki Shimamune, Tokyo (JP);
Masashi Tanaka, Kanagawa (JP);
Yasuo Nakajima, Tokyo (JP);
Yoshinori Nishiki, Kanagawa (JP);
Hideto Shimizu, Kanagawa (JP)

(73) Assignee: Permelec Electrode Ltd., Kanagawa (JP)

( * ) Notice: Subject to any disclaimer, the term of this patent is extended or adjusted under 35 U.S.C. 154(b) by 771 days.

(21) Appl. No.: 08/818,447

(22) Filed: Mar. 17, 1997

(30) Foreign Application Priority Data

Mar. 27, 1996 (JP) ............................................. 8-097596

(51) Int. Cl.$^7$ ................................................ C02F 1/461
(52) U.S. Cl. ....................... 205/464; 205/701; 205/742; 205/746
(58) Field of Search ................................ 205/464, 701, 205/742, 746

(56) References Cited

U.S. PATENT DOCUMENTS 3,616,355 A * 10/1971 Themy ....................... 204/149
4,867,856 A * 9/1989 Okazaki ..................... 204/228
5,445,722 A * 8/1995 Yamaguti et al. ........... 204/229
5,543,030 A * 8/1996 Shiramizu et al. .......... 205/464

FOREIGN PATENT DOCUMENTS

JP          5237478      *  9/1993       ................ 205/742

* cited by examiner

Primary Examiner—Arun S. Phasge
(74) Attorney, Agent, or Firm—Sughrue Mion, PLLC

(57) ABSTRACT

Electrolysis is carried out while supplying an aqueous sodium chloride solution having a weak acidic property to the anode chamber of a water electrolytic cell. The electrolytic cell is partitioned with a cation-exchange membrane into an anode chamber and a cathode chamber. Furthermore, because the pH of the anolyte is sufficiently reduced due to the acid content and pH of the liquid supplied to the anode chamber from the start of electrolysis, which is different from a conventional electrolytic method, the electrolysis of the present invention may be carried out for a time needed to obtain a sufficiently high oxidation reduction potential. Thus, acid water almost the same as that obtained in a conventional method is obtained in the present invention by consuming about $\frac{1}{10}$ the electric power that is used in a conventional method.

14 Claims, No Drawings

PRODUCTION METHOD OF ACID WATER AND ALKALINE WATER

FIELD OF THE INVENTION

The present invention relates to a method of simultaneously forming alkaline water of high purity and acid water of high purity using a two-chamber-type electrolytic cell. More specifically, the present invention relates to an electrolytic method of simultaneously forming (i) acid water which can be used for sterilization and disinfection and also for the treatment of skin diseases, and (ii) alkaline water having a low oxidation reduction potential which is good for drinking.

BACKGROUND OF THE INVENTION

The catholyte obtained by electrolyzing municipal water with a diaphragm cell or so-called alkali ion water is said to be effective as a medicine, and is also said to have improved taste. Thus, the catholyte has enjoyed widespread use. Recently, the reduced quality of municipal water has resulted in an unpleasant odor and bad taste. As a countermeasure therefor, an apparatus for producing alkali ion water (alkaline water) and which is capable of simultaneously removing impurities and deodorizing by incorporating active carbon or a microfilter in the above-described electrolytic cell has been widely used.

On the other hand, for the production and washing of electronic parts, specially prepared sulfuric acid, hydrofluoric acid, hydrogen peroxide, hydrochloric acid, etc., has hitherto been used. However, because impurities are introduced into this system and the purification technique for removing such impurities is troublesome, a method of producing acid water for washing by a water electrolysis technique has been proposed. The electrolysis is carried out by adding chloride ion to the anode chamber of the electrolytic cell to thereby obtain an acid electrolyte having a very high oxidation reduction potential. Because the solution has a strong sterilizing action and a strong disinfecting action initially as well as after use, sodium chloride or chloride ion alone remains to the same extent as in municipal water. When the used wash solution is discarded, problems such as secondary pollution, etc., do not occur. Thus, the above described solution has been widely used for various applications.

In the water electrolysis, when ammonium chloride ($NH_4Cl$) or sodium chloride (NaCl) for example is used as an electrolyte in the anode chamber, the anodic reaction is a disproportionation reaction represented by:

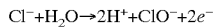

$$Cl^- + H_2O \rightarrow 2H^+ + ClO^- + 2e^-$$

The solution in the anode chamber becomes acidic with the hydrogen ion thus formed, and the resulting hypochlorous acid solution has a pH of 3 or less and an oxidation reduction potential (ORP) higher than 1.2 volts.

On the other hand, in the cathode chamber, hydroxide ion is formed and at the same time, part of the mineral components are transferred to the cathode side. The resulting drinking water which is formed as the catholyte and which can promote good health contains mineral components, has a slightly alkaline pH and has a very low ORP due to the generation of hydroxide ion and hydrogen. That is, it has been widely recognized that the decomposition of active chloride in municipal water by cathodic reduction, the reduction in oxidation reduction potential due to hydrogen generated by the electrolysis, the formation of alkali due to the hydroxy group simultaneously generated by the electrolysis, the transfer of calcium ion to the cathode side, etc., act to improve the water quality. All of this improves the taste when the catholyte is used as drinking water.

However, even if it is possible to simultaneously remove acid water from the anode chamber and alkaline water from the cathode chamber by such an electrolytic method, problems are encountered in that the separation provided by the diaphragm is not so effective, the electrolyte concentrations are increased and the acid and the alkali are mixed through the diaphragm. This results in reducing by one-half the effect of the electrolysis. Furthermore, the addition of sodium chloride to the anode chamber for obtaining stronger acid water is accompanied by the problem that the pH is slightly increased in the cathode chamber and the concentration of sodium chloride is also increased. As a result, water that is suitable for drinking is not always obtained. Also, the ORP increases in the anode chamber. However, when the electrolysis is carried out by paying attention to the increase in ORP alone, the pH of the anolyte is not sufficiently lowered and the washing effect of the water thus obtained is inadequate.

To avoid this problem, means of increasing the thickness of the diaphragm to thereby restrain the diffusion of each liquid, and also means of increasing the distance between electrodes to thereby prevent the reaction products from mixing with each other, have been proposed. However, because the electric conductivity of water is low, a large electric current cannot pass through the electrodes in such an electrolytic cell. A practical electrolytic current density is about 1 $A/dm^2$, and even in a small-sized domestic apparatus, the electrode area must be increased by using from 3 to 5 electrodes each having an area of about 5×10 $cm^2$. Such an electrolytic cell is disadvantageous in that the structure is complicated, the maintenance thereof takes too much time and labor, and furthermore, the electrolytic cell itself is too expensive.

To solve these problems, the present inventors previously proposed an electrolytic method capable of using a current density higher than several tens of $A/dm^2$ by closely contacting an electrode substance with an ion-exchange membrane, and by using the ion-exchange membrane thus prepared as a solid electrolyte. The electrolytic voltage in this method was about few volts, which made electrolysis possible at a voltage far lower than that found in conventional methods. In this method, the present inventors also proposed to produce an acid water having a high ORP in the anode chamber by adding a slight amount of an acid or a salt to the anode chamber, which acid water was to be used for washing an apparatus, etc. Also, the present inventors determined that in this case, by using a non-metallic salt, a low-ORP liquid containing a non-metallic alkali such as ammonia suitable for washing semiconductors, etc., was formed in the cathode chamber.

However, although the above described catholyte and anolyte are formed, the foregoing method is inadequate for simultaneously forming liquids for washing (sterilization) and for drinking. That is, when the salt of an inorganic acid such as hydrochloric acid, sulfuric acid, etc., is added to the anode chamber, an acid and a high-ORP electrolyte suitable for washing is obtained in the anode chamber. However, the alkaline property of the catholyte becomes too high and as a result, the catholyte is unsuitable for drinking.

Also, when a metal salt is added, the above objective is almost achieved and acid water having a low pH and alkali water having a weak alkaline property is obtained. However, there is a problem in that large electric currents are required. That is, in the case of using a neutral salt such as, for example, a chloride, the ORP is regulated by the concentration of hypochlorous acid thus formed. Hypochlorous acid in a concentration of from 1 to 5 ppm is sufficient, and chlorine gas is generated if the concentration thereof exceeds ppm. If the current efficiency of chlorine generation is assumed to be 10%, a pH of about 4 to 5 is achieved by the hydrochloric acid formed in the above described reaction. To achieve a desired pH of 3 or lower, excessive electrolysis which ignores the current efficiency of chlorine generation is needed. Chlorine gas is generated when the chloride ion concentration is high, and when the chloride ion concentration is low, ozone is generated in part and the electrolysis amounts to a simple water electrolysis. On the other hand, in the cathode chamber, alkaline water having an alkalinity that is unsuitable for drinking is obtained. This is due to the metal hydroxide formed from the metal salt and the hydroxide ion that is generated in the electrolysis.

As described above, despite the fact that excessive electric power and a large electrolytic apparatus are required in conventional electrolytic methods, a means capable of simultaneously producing a catholyte for drinking water and a useful anolyte has not hitherto been achieved.

SUMMARY OF THE INVENTION

Thus, an object of the present invention is to solve the above described problems of the prior art and to provide a method of simultaneously forming, by electrolysis, an acid water having a relatively strong acidic property that is particularly suitable for washing and an alkaline water having a relatively weak alkalinity that is particularly suitable for drinking.

That is, the present invention provides a method of producing acid water and alkaline water, which comprises providing a water electrolytic cell which is partitioned by a cation-exchange membrane into an anode chamber and a cathode chamber, supplying an aqueous sodium chloride solution having a weak acidic property to the anode chamber, and conducting electrolysis to thereby obtain acid water having a high oxidation reduction potential from the anode chamber and weak-alkaline water having a pH of from 7 to 9.5 and a low oxidation reduction potential from the cathode chamber.

DETAILED DESCRIPTION OF THE INVENTION

The present invention is described in detail below.

A characteristic feature of the present invention is the step of carrying out water electrolysis while supplying an aqueous sodium chloride solution having a weak acidic property to the anode chamber of an electrolytic cell. The aqueous sodium chloride solution having a weak acidic property is a mixture of a weak acid and an aqueous sodium chloride solution, a mixture of a diluted solution of a strong acid and an aqueous sodium chloride solution, or a solution obtained by dissolving an acid and sodium chloride in municipal water, etc. Weak acidic property means low concentration of $H^+$ (pH=3 to 5), that is, weak acid and/or diluted strong acid. Strong acid means, e.g., HCl, $H_2SO_4$, etc., which dissociate completely in water. The electrolytic cell is a water electrolytic cell which is partitioned with a cation-exchange membrane into an anode chamber and a cathode chamber.

Typical electrolytes which are used in a conventional water electrolysis include (1) water, (2) hydrochloric acid, and (3) an aqueous sodium chloride solution. In the electrolysis of water (1), weak acid water is obtained in the anode chamber and water in a neutral range of from pH 6 to 8 is obtained in the cathode chamber depending on the operating conditions. In the electrolysis of hydrochloric acid (2), acid water is obtained in both the anode chamber and the cathode chamber. Furthermore, in the electrolysis of an aqueous sodium chloride solution (3), strong acid water is obtained in the anode chamber and strong alkaline water is obtained in the cathode chamber. As described above, conventional water electrolysis does not allow for simultaneously obtaining strong acid water in the anode chamber and weak alkaline water in the cathode chamber. Thus, one is compelled to obtain strong acid water and weak alkaline water in separate electrolytic operations which results in reduced working efficiency.

The present inventors considered that when electrolysis is carried out using a neutral electrolyte, if strong acid water is obtained in the anode chamber, then strong alkaline water is obtained from the cathode chamber. On the other hand, if weak acid water is obtained in the anode chamber, then weak alkaline water is normally obtained from the cathode chamber. Hence, when a neutral electrolyte is used, the combination of acid water and alkaline water, which is an object of the present invention, is not obtained. Thus, the present invention has been achieved by controlling the acid-alkali balance to thereby simultaneously obtain acid water and alkaline water in accordance with the above objective.

That is, by carrying out electrolysis using an aqueous sodium chloride solution having a weak acidic property as the anode feed, the acidic property obtained by hypochlorous acid formed in the anode chamber by the electrolysis of the aqueous sodium chloride solution is balanced with the alkalinity of the hydroxide formed in the cathode chamber. Furthermore, the acidic property of the anode feed supplied to the anode chamber (i.e., the aqueous sodium chloride solution having a weak acidic property) increases upon electrolysis to provide an anolyte having the desired acidic property. When the pH of the anolyte obtained by electrolysis is 4, the pH of the catholyte is about 10, although the values of pH depend upon various conditions such as the concentration of the acid that is added.

However, in the conventional electrolysis of an aqueous sodium chloride solution, strong acid water is formed in the anode chamber and strong alkaline water is formed in the cathode chamber. In order to form weak alkaline water in the cathode chamber, which is on object of the present invention, it is necessary to restrain the progress of the electrolysis. This is done by controlling the electrolysis conditions to restrain the hydroxyl ion concentration in the cathode chamber. For attaining this objective, it is most preferred to reduce the concentration of the aqueous sodium chloride solution that is supplied to the anode chamber, and the concentration of the aqueous sodium chloride solution that is supplied may be determined by calculation based on the amount and the alkalinity of the catholyte thus formed.

Also, in conventional water electrolysis, the pH is lowered and the ORP is simultaneously increased by increasing the concentration of hypochlorous acid. For example, an ORP having a sufficient sterilizing action or a sufficient disinfecting action is considered to be 1,000 mV or higher, and the concentration of hypochlorous acid needed to obtain such ORP is from about 1 to 10 ppm. On the other hand, the pH required for a washing liquid, etc., having a sterilizing action or a disinfecting action, is from about 3 to 4 and the concentration of hypochlorous acid that is needed to obtain this pH is about 1,000 ppm. That is, 99% or more of hypochlorous acid that is formed in the electrolysis is unnecessary for lowering the pH. Furthermore, if means other than above can be used for lowering the pH, the amount of electric power that is consumed becomes ¹/₁₀₀ or less. In the present invention, an acid is added to a liquid that is supplied to the anode chamber from the beginning of electrolysis as described above. The pH lowering due to the foregoing acid in addition to the pH lowering by the water electrolysis is sufficient to lower the pH to the desired level without need of performing excessive electrolysis. Thus, a strong acid water satisfying the desired conditions is obtained with a minimum of electrolysis.

In other words, in conventional electrolysis a strong acid water is formed by excess electrolysis required for obtaining proper ORP. On the other hand, by improving the oxidation efficiency with chloride ion, which is most important for the disinfecting action, and by separately controlling the pH of the acid water thus obtained, the above problems of conventional electrolysis are solved in the present invention.

In the present invention, a cation-exchange membrane is used as a diaphragm to control the transfer of the ions and the electrolytes. Cations transfer from the anode chamber to the cathode chamber through a cation-exchange membrane in an applied electric field, but the transfer of hydroxide ion from the cathode chamber to the anode chamber is restrained by a cation-exchange membrane. Accordingly, in the anode chamber, the hydrogen ion concentration formed by electrolysis becomes excessive, and the anolyte becomes acidic due to the amount of other cations that are transferred. Also, in the cathode chamber, a hydroxide is formed with the cations (mainly, sodium ions from the electrolysis of an aqueous sodium chloride solution) from the anode chamber and the hydroxide ions to provide a stabilized alkaline water. In this case, the catholyte in the cathode chamber is a weak alkaline water having a pH of from about 7 to 9.5 formed by regulating the concentration of the aqueous sodium chloride solution as described above. On the other hand, the anolyte becomes a strong acid water due to the hydrogen ion generated by electrolysis of the aqueous sodium chloride solution and also due to the acid that is supplied with the aqueous sodium chloride solution from the beginning of the electrolysis.

There is no particular limitation on the cation-exchange membrane for use in the present invention if cations are selectively passed though the membrane. However, it is desirable to use a fluorine resin-type cation-exchange membrane which is stable to the acid water formed in electrolysis and which is expected to provide long life in a zero gap-type or similar electrolysis for lowering the electrolytic voltage. Also, because the electric conductivity of the electrolytes is low, the anode and the cathode are preferably disposed adjacent to the foregoing cation-exchange membrane. Furthermore, the above-described zero-gap-type electrolytic cell is constituted by closely adhering one or both of the anode and the cathode to the cation-exchange membrane such that the cation-exchange membrane is substantially a solid electrolyte. The electric conductivity of the cation-exchange membrane is generally from about 1 to 10 $\Omega/cm^2$, although this value may change a little depending on conditions, which is very low as compared with the electric conductivity of electrolyte (or feed solution) or water. Also, in the electrolysis at a high current density of 10 $A/dm^2$ or higher, the electrolytic voltage is about few volts such that the electric power saving effect is large. However, there is a possibility of lowering the current efficiency of forming hypochlorous acid even though this tendency is slight. Thus, the foregoing zero-gap-type electrolysis or ordinary electrolysis may be selected depending on the intended application.

There is no particular limitation on the electrode material for use in the present invention. In particular, an anode material having a high current efficiency is desirable, namely, high chlorine generating efficiency in a diluted chloride-ion-containing solution. However, when taking into consideration current efficiency and stability, and also the stability of the anode material against dissolution, a platinum electrode is preferred. The platinum electrode is inferior to a platinum-group metal oxide electrode with respect to chlorine generating efficiency at a relatively high chloride ion concentration, but maintains good efficiency even in a low-concentration chloride solution and is very effective at a chloride ion concentration of 1,000 ppm or lower in the present invention. The platinum electrode may be a platinum-plated titanium electrode or a platinum mesh electrode, and the electrode may be selected depending on the amount of electric current that is passed through the cell.

In the present invention, by using such an electrolytic cell, the electrolysis is carried out while supplying an aqueous sodium chloride solution having a weak acidic property to the anode chamber. The aqueous sodium chloride solution having a weak acidic property is preferably prepared by adding an acid such as hydrochloric acid, etc., to an aqueous sodium chloride solution such that pH of the solution is about 3 to 4. In the case of using hydrochloric acid, the total chloride concentration is 3,000 ppm or lower and, preferably from 500 to 1,500 ppm. Namely, because the liquid supplied to the anode chamber is acidic, the current efficiency is high as compared with a neutral sodium chloride solution. However, if the chloride ion concentration is lower than 500 ppm, the current efficiency for chlorine generation tends to decrease and excessive electric current is required. Also, in the case of such an acidic aqueous sodium chloride solution, a high current efficiency for chlorine generation is obtained and hypochlorous acid is formed. However, if the foregoing chlorine concentration is over 3,000 ppm, part of the chloride forms chlorine gas which is dangerous and which can also corrode the apparatus. As a matter of course, in municipal water, etc., the extent of chlorine gas generation depends on the kind of metal ions contained therein. For example, when $Fe^{2+}$ ions are present and because chlorine oxidizes $Fe^{2+}$ to $Fe^{3+}$, chlorine gas is not generated until all of said ions are oxidized to $Fe^{3+}$ ions. Furthermore, 3,000 ppm as described above is standard in the case of using municipal water. The acid which can be added to the aqueous sodium chloride solution for use in the present invention includes hydrobromic acid and hydrofluoric acid in addition to hydrochloric acid.

In principle, water is supplied to the cathode chamber in the same amount as the liquid that is supplied to the anode chamber. By supplying water while keeping the electrolytic voltage low, alkaline water having pH of from 7 to 9.5, and preferably from 8 to 9 is obtained as a catholyte and the ORP thereof is 200 mV or lower. When the amount of water supplied to the cathode chamber is decreased, the pH of the anolyte is further increased and the ORP thereof becomes 0 or a negative voltage. However, in this case, because the resistance of the cation-exchange membrane is increased, the electrolytic voltage is slightly increased. On the other hand, when the amount of water supplied to the cathode chamber is increased, an almost contrary phenomenon occurs. That is, the pH decreases (the pH increase in reduced) and the ORP increases (the ORP decrease is also reduced). Accordingly, the pH and ORP of the alkaline water thus obtained can be controlled by controlling the amount of water that is supplied to the cathode chamber.

The solubility of calcium and magnesium contained in municipal water, etc., becomes very low under alkaline conditions, and these minerals are deposited as hydroxides. Because the concentrations of the hydroxides thus deposited are low, their influence is small. In the present invention where the acidic aqueous sodium chloride solution is prepared using municipal water, there is no problem in the anode chamber. However, in the cathode chamber where the catholyte becomes alkaline, there is a possibility that the hydroxides will deposit as described above. In particular, when the foregoing cation-exchange membrane is used as a solid electrolyte, the cation-exchange membrane may possibly become clogged with the deposited hydroxides, such that it becomes necessary to remove the deposited hydroxides.

Means for removing the deposited hydroxides include a method of directing intermittently or, preferably regularly for a short period of time the liquid supplied to the anode chamber to the cathode chamber. As a result, the liquid around the cathode and the cation-exchange membrane is made acidic, such that the deposited hydroxides are dissolved and in this case the electrolysis may proceed. However, there is a possibility that the pH of the catholyte is temporarily lowered to become an acid water. Also, the polarities of the electrodes may be regularly reversed to thereby pass a reverse current. In this case, both the supplying liquids may be reversed. However, for ease of operation, the supplying liquids are not reversed and the objective can be sufficiently obtained by reversing the electric current alone. The frequency of deposit removal depends on the electrolytic conditions and the quality of water, but usually this operation may be carried out for several minutes per 2 to 3 hours of electrolysis.

The production method of acid water and alkaline water of the present invention is described in greater detail below by reference to the following Examples, but the present invention should not be construed as being limited thereto.

EXAMPLE 1

Two titanium plates ware provided each having an electrode area of 10 cm$^2$, and carrying a platinum catalyst prepared by a thermal decomposition method. The plates were disposed on both sides of a cation-exchange membrane, Nafion 350 (trade name, made by E.I. Du Pont de Nemours and Company), each with an interval of 1 cm to constitute a two-chamber type water electrolytic cell. Municipal water having added thereto sodium chloride and hydrochloric acid such that the total chloride ion concentration was 1,000 ppm and the pH was 3 was supplied to the anode chamber of the electrolytic cell. Additionally, city water having a total residual chlorine content of 0.5 ppm and an ORP of 750 mV was supplied to the cathode chamber. Both liquids were each supplied at a rate of 20 liters/hour, and electrolysis was carried out at an electric current of 2 A.

As a result of electrolysis, acid water having a pH of 2.5 and an ORP of 1,100 mV was obtained from the anode chamber, and alkaline water having a pH of 8.2 and an ORP of 50 mV was obtained from the cathode chamber.

Comparative Example 1

Electrolysis was carried out under the same conditions as Example 1, except that a neutral aqueous sodium chloride solution having a total chloride concentration of 1,000 ppm was supplied to the anode chamber. The acid water obtained from the anode chamber had a pH of 4.5 and an ORP of 950 mV, and the alkaline water obtained from the cathode chamber had a pH of from 9.5 to 10 and an ORP of 190 mV. In contrast to Example 1, a sufficient reduction in pH was not obtained in the anolyte. Furthermore, the alkali concentration of the alkaline water in the cathode chamber was too high and therefore unsuitable for drinking.

EXAMPLE 2

A Nafion 115 membrane (trade name, made by E.I. Du Pont de Nemours and Company) was used as a cation-exchange membrane and meshes prepared by knitting with a platinum wire (the platinum content of the anode was 1 g/cm$^2$, and the platinum coverage of the cathode was 0.2 g/cm$^2$) were used as electrodes. Then, a solid electrolyte type ion-exchange membrane was prepared by pressing the meshes to the cation-exchange membrane from both sides thereof, and the solid electrolyte type cation-exchange membrane was disposed in an electrolytic cell. Electrolysis was carried out at an electric current of 3 A while supplying various aqueous sodium chloride solutions to the anode chamber at a rate of 40 litters/hour each having a pH of 3 but a different total chloride ion concentration as shown in Table 1. Municipal water was supplied to the cathode chamber at a rate of 40 liters/hour. As a result, the anolytes and the catholytes shown in Table 1 were obtained at an electrolytic voltage of from 4.5 to 5 volts.

TABLE 1

| (A) (ppm) | 500 | 700 | 1000 | 2000 | 3000* | 5000* |
|---|---|---|---|---|---|---|
| (B) pH | 2.6 | 2.5 | 2.5 | 2.4 | 2.4 | 2.4 |
| (C) (mV) | 950 | 1100 | 1140 | 1150 | 1150 | 1150 |
| (D) pH | 8.0 | 8.5 | 9.2 | 9.4 | 9.5 | 9.6 |
| (E) (mV) | 180 | 50 | 20 | 0 | −40 | −60 |

*The anolyte became yellowish and smelled of chlorine.
(A): Total chloride concentration of the liquid supplied to the anode chamber.
(B): Anolyte,
(C): Anolyte ORP
(D): Catholyte,
(E): Catholyte ORP

Comparative Example 2

Electrolysis was carried out under the same conditions as in Example 2, except that an aqueous sodium chloride solution having a pH of 7 obtained by dissolving sodium chloride alone in municipal water was supplied to the anode chamber. The pH of the anolyte thus obtained was from 4 to 5 and therefore was not suitable for use as an acid water. Also, the pH of the catholyte was from 9.5 to 10 or higher.

Comparative Example 3

Electrolysis was carried out under the same conditions as Comparative Example 1, except that the electric current was changed to 30 A. The anolyte thus obtained had a pH of 2.5 and an ORP of 1,100 mV, and the catholyte thus obtained had a pH of 11.

The above comparative results demonstrate that in the present invention strong acid water and weak alkaline water are simultaneously produced at an electric current that is about 1/10 of that consumed in conventional methods. In other words, the method of the present invention provides a treatment capacity of 10 times or more as compared with conventional methods using the same electrolytic equipment.

In the method of the present invention, an aqueous sodium chloride solution having a weak acidic property is supplied to the anode chamber in place of an aqueous sodium chloride solution, hydrochloride acid, or water as used in conventional water electrolysis methods. Thus, in accordance with the method of the present invention, it is possible to simultaneously produce a weak (but stronger than the conventional process) acid anolyte in the anode chamber and a weak alkaline catholyte in the cathode chamber. The fault in conventional technology is that when strong acid water is formed in the anode chamber by supplying a neutral liquid to the anode chamber, strong alkaline water is inevitably formed in the cathode chamber. On the other hand, when weak acid water is formed in the anode chamber, weak alkaline water is inevitably formed in the cathode chamber. This is solved by adding an acid in the liquid supplied to the anode chamber, to form strong acid water in the anode chamber and weak alkaline water in the cathode chamber.

Also, in conventional water electrolysis for obtaining strong acid water having a high ORP, acid water having a low pH is obtained by increasing the amount of hypochlorous acid that is formed, etc. That is, excessive electrolysis is carried out for forming more than the necessary amount of hypochlorous acid. However, according to the method of the present invention, the acid component necessary for decreasing pH is contained in the liquid supplied to the anode chamber from the beginning of electrolysis. Thus, the electrolysis may be carried out for obtaining the desired high ORP alone. Also, the desired strong acid water is obtained using far less electric power than in conventional methods. Furthermore, large amounts of acid water and alkaline water are obtained using a small-sized electrolytic equipment.

Furthermore, the current efficiency of forming hypochlorous acid is higher, and a more economic electrolytic operation becomes possible when using an aqueous sodium chloride having a weak acidic property as compared to carrying out electrolysis using a neutral aqueous sodium chloride solution. Also, as described above, the acid added to the aqueous sodium chloride solution is preferably hydrochloric acid, and hydrobromic acid or hydrobromic acid can also be used.

When the electrolysis is carried out using an aqueous sodium chloride solution having a weak acidic property prepared by adding an acid and sodium chloride to municipal water, calcium and magnesium contained in the municipal water are reduced to form the hydroxides thereof. Because the hydroxides are deposited in the cathode chamber and can possibility clog the cation-exchange membrane, these hydroxides are preferably removed. For this purpose, the direction of the electric current passed through the cell can be intermittently reversed. That is, by reversing the polarities of the anode and the cathode such that the original cathode chamber functions as the anode chamber, the deposited hydroxides are oxidized and dissolved. By short-circuiting the electrodes, almost the same effect is obtained.

Moreover, by supplying acid water, for example, the liquid that is supplied to the anode chamber, to the cathode chamber, the foregoing hydroxides may also be dissolved.

While the invention has been described in detail and with reference to specific embodiments thereof, it will be apparent to one skilled in the art that various changes and modifications can be made therein without departing from the spirit and scope thereof.

What is claimed is:

1. A method of producing acid water and alkaline water, which comprises providing a water electrolytic cell which is partitioned by a cation-exchange membrane into an anode chamber and a cathode chamber, supplying an aqueous sodium chloride solution having a pH of about 3 to 4 to the anode chamber, supplying water to the cathode chamber, conducting electrolysis, and simultaneously recovering acid water having an oxidation reduction potential of 1,000 mV or higher and a pH of about 3 to 4 from the anode chamber and weak alkaline water having an oxidation reduction potential of 200 mV or less and a pH of from 7 to 9.5 from the cathode chamber.

2. The method of claim 1, which comprises supplying an aqueous solution of sodium chloride and hydrochloric acid to the anode chamber.

3. The method of claim 1, which comprises supplying to the anode chamber an aqueous solution of sodium chloride and an acid selected from the group consisting of hydrochloric acid, hydrobromic acid and hydrofluoric acid.

4. The method of claim 1, which comprises supplying to the anode chamber an acidic aqueous sodium chloride solution having a chloride content of 3,000 ppm or less.

5. The method of claim 1, which comprises supplying to the anode chamber an acidic aqueous sodium chloride solution having a chloride content of from 500 to 1,500 ppm.

6. The method of claim 1, which comprises supplying to the anode chamber an aqueous sodium chloride solution having a pH of about 3 to 4 from the beginning of electrolysis.

7. The method of claim 1, which comprises obtaining a weak alkaline water from the cathode chamber having a pH of from 8 to 9.

8. The method of claim 1, wherein said anode chamber comprises an anode electrode, said cathode chamber comprises a cathode electrode, said step of conducting electrolysis comprises passing an electric current through said electrolytic cell to thereby deposit metal hydroxides in the cathode chamber, and said method further comprises the step of passing a reverse electric current through said cell or short circuiting the anode and cathode electrodes to thereby dissolve said deposits.

9. The method of claim 8, wherein said deposits comprise at least one of calcium hydroxide and magnesium hydroxide.

10. The method of claim 1, wherein a metal hydroxide is deposited in the cathode chamber during said step of conducting electrolysis, and said method further comprises the step of supplying an aqueous sodium chloride solution having a weak acidic property to the cathode chamber to thereby dissolve said deposits.

11. The method of claim 10, wherein the same aqueous sodium chloride solution having a weak acidic property is supplied to both the anode and the cathode chambers.

12. The method of claim 10, wherein said deposits comprise at least one of calcium hydroxide and magnesium hydroxide.

13. An electrolytic method of simultaneously producing acid water and alkaline water, which comprises providing a water electrolytic cell which is partitioned by a cation-exchange membrane into an anode chamber and a cathode chamber, supplying an aqueous sodium chloride solution having a pH of about 3 to 4 and a chloride content of from 500 to 1,000 ppm to the anode chamber, supplying water to the cathode chamber, conducting electrolysis, and simultaneously recovering an anolyte having a pH of about 3 to 4 and an oxidation reduction potential of 1,000 mV or higher from the anode chamber and a catholyte having a pH of from 7 to 9.5 and an oxidation reduction potential of 200 mV or less from the cathode chamber.

14. The method of claim 13, which comprises recovering a catholyte having a pH of from 8 to 9 from the cathode chamber.

* * * * *